J. R. SAMPLE.
Seed-Planters.

No. 158,318.　　　　　　　　　　Patented Dec. 29, 1874.

WITNESSES:　　　　　　　　　　INVENTOR:

UNITED STATES PATENT OFFICE.

JACOB R. SAMPLE, OF LIBERTY, MISSISSIPPI.

IMPROVEMENT IN SEED-PLANTERS.

Specification forming part of Letters Patent No. 158,318, dated December 29, 1874; application filed September 22, 1874.

*To all whom it may concern:*

Be it known that I, JACOB R. SAMPLE, of Liberty, in the county of Amite and State of Mississippi, have invented a new and Improved Seed-Planter; and I do hereby declare that the following is a full, clear, and exact description of the same, reference being had to the accompanying drawing forming a part of this specification, in which—

Figure 1:
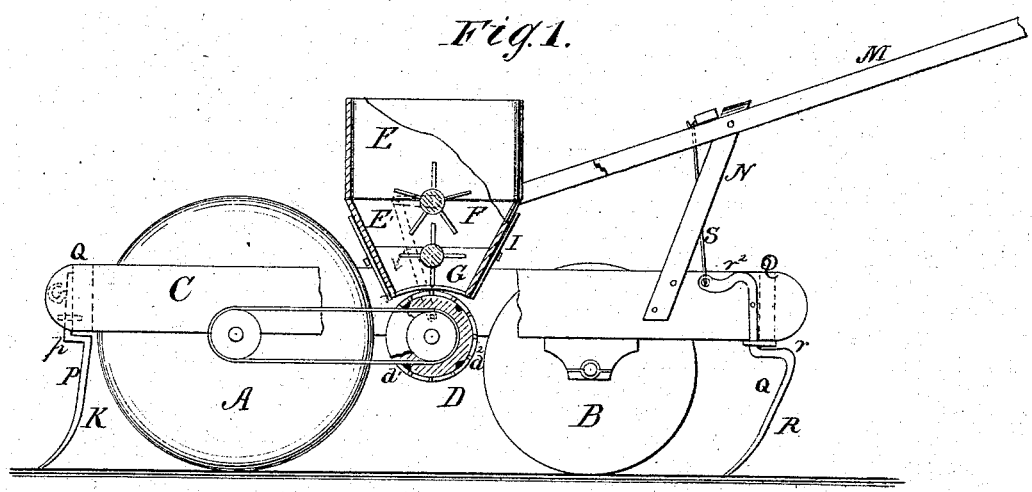
Figure 2:
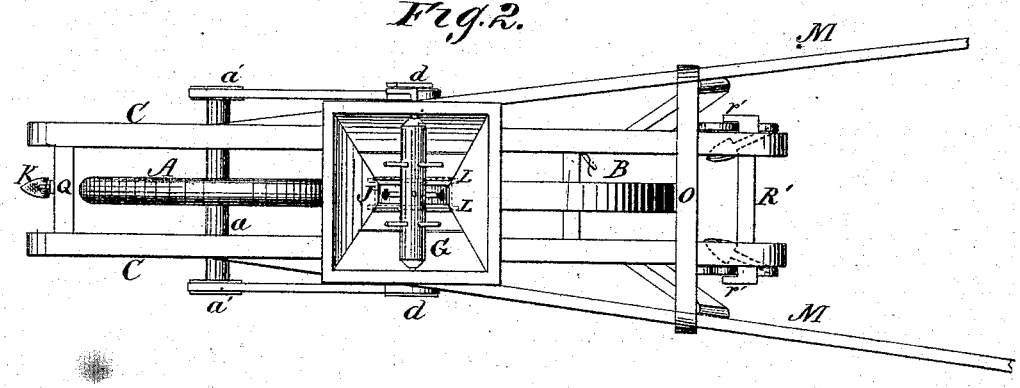

Figure 1 is a longitudinal sectional elevation; Fig. 2, a plan view.

The invention contemplates the improvement in that class of agricultural machines used for planting cotton or grain, and for distributing comminuted manures.

The invention will first be fully described, and then pointed out in the claims.

A and B represent two tandem disk-wheels, whose shafts, $a$ $b$, revolve in bearings attached to the under side of two parallel longitudinal beams, C C. Between these is located a smaller grooved distributer or seed-wheel, D, and just above the latter a hopper, E E', in which are two spike-wheels or stirrers, F G. One of these stirrers, F, oscillates while the lower is rotated by the teeth of the seed-wheel, the shaft of the upper one being connected by a crank and pitman, H, with the pulley $d$ on shaft D'. The corresponding pulleys $d$ $d$ are connected with pulleys $a'$ $a'$ on shaft $a$, and thus the feed of grain or manure is made uniformly in the furrow. The large wheel A is bevel-edged, so as to follow the furrowing-plow K, and make a straight, clean, and uniform bed for the reception of the seed, while the rear wheel, B, has a flat periphery to press fine dirt into immediate proximity of the seed, and thus enable its radicles to get a quick hold and rapid growth. The groove of seed-wheel D is square at bottom, provided with four small excavations, $d^1$, for grain, pease, or other seed. I screw detachably into the bottom of groove several teeth, $d^2$, which, at the upper end, reach to the top of the wheel-flanges. The hopper consists of the two parts E E', the upper square, and the lower tapering to the slot or delivery $e$. On the outside of lower section of hopper is a slide-board, I, and on the inside a slide-board, J, the former being omitted in the planting of cotton. Within the hopper are also placed two opposite slides, L L, that serve to graduate the quantity of seed or manure that is to be used to the acre.

When the farmer wishes to use the machine as a grain-dropper, he removes the teeth from seed-wheel, the two stirrers, and the upper section of hopper. The outside board is then slipped down until its tongue appears in the groove of seed-wheel, and the board in rear of hopper reversed, so that its tongue also extends within groove of seed-wheel. The inside board is now removed, to allow the slot to be packed with cotton, wool, or other material, and then replaced. Thus it is brought about that no grain escapes except what the small excavations will contain.

If all the excavations are left open, the grain will be dropped about one foot apart, and so in proportion.

M M are the handles, which are secured to frame in front and in the rear by supports N N, while O is a cross-brace, which holds them laterally and firmly in place. K is the opening-plow, which is cranked on its standard P at $p$, so as to receive a bearing and throw the strain upon the cross-bar Q, while the covering-plows R R are also cranked at $r$ on their standards Q', so as to be supported by the cross-bar R', that has projections $r^1$ to prevent their lateral play.

The covering-plows are set a little toward each other, so as to be self-cleaners, are pivoted to longitudinal beams, and are provided with crooked shanks $r^2$, that enable the operator, by cords S, to throw them up and out of the way, whenever desired.

The plow P opens a furrow, the bevel-wheel makes the seed-bed, the grooved wheel distributes the seed, the flat-rimmed wheel presses fine dirt in contact with said seed, and the plows R R give the final covering.

Having thus described my invention, what I claim as new is—

1. A plow, K, having bend $p$ about midway of its shank, combined with the cross-bar Q, as shown and described, so that the strain will be taken on the bottom of said bar.

2. The plow R, having its shank pivoted to the frame, and having a forward bend, $r^2$, as and for the purpose set forth.

3. The combination, with a cranked plow-standard, R, of a cross-bar, R', having end projections $r^1$ $r^1$, as and for the purpose specified.

JACOB R. SAMPLE.

Witnesses:
C. P. NEILSON,
W. P. ANDERSON.